(12) United States Patent
Qin

(10) Patent No.: US 8,536,453 B2
(45) Date of Patent: Sep. 17, 2013

(54) WATERPROOF DEVICE

(75) Inventor: Gang-Qiang Qin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 65 days.

(21) Appl. No.: 13/326,432

(22) Filed: Dec. 15, 2011

(65) Prior Publication Data

US 2012/0262037 A1 Oct. 18, 2012

(30) Foreign Application Priority Data

Apr. 14, 2011 (CN) .......................... 2011 1 0093167

(51) Int. Cl.
*H05K 5/00* (2006.01)
*H02G 3/08* (2006.01)

(52) U.S. Cl.
USPC .............. 174/50; 174/520; 174/559; 220/3.2; 220/3.3; 361/679.01

(58) Field of Classification Search
USPC .............. 174/50, 53, 57, 520, 559, 17 R, 66, 174/67, 535, 485; 220/3.2–3.9, 4.02, 241, 220/242; 361/600, 601, 679.01; 439/535, 439/536, 76.1, 76.2
See application file for complete search history.

(56) References Cited

U.S. PATENT DOCUMENTS

| | | | | |
|---|---|---|---|---|
| 6,265,662 B1 * | 7/2001 | Riedy et al. | ..................... | 174/67 |
| 6,455,768 B2 * | 9/2002 | Negishi | ........................... | 174/50 |
| 6,768,054 B2 * | 7/2004 | Sato et al. | ....................... | 174/50 |
| 6,852,924 B2 * | 2/2005 | Lessard | .......................... | 174/50 |
| 6,881,899 B1 * | 4/2005 | Trangsrud | ....................... | 174/50 |
| 7,064,268 B2 * | 6/2006 | Dinh | ............................. | 174/485 |
| 7,265,292 B2 * | 9/2007 | Greenfield | ....................... | 174/67 |
| 8,013,245 B2 * | 9/2011 | Korcz et al. | .................... | 174/66 |

* cited by examiner

*Primary Examiner* — Angel R Estrada
(74) *Attorney, Agent, or Firm* — Altis Law Group, Inc.

(57) ABSTRACT

A waterproof device for receiving an electronic device is disclosed. The waterproof device includes a housing including an outer surface. A receiving case including a body and covering portion extends from the body. The body is inside of the housing, and the covering portion abuts the outer surface of the housing. The body receives an object to be waterproofed. A cover is secured to the covering portion. A first installation washer is secured between the covering portion and the outer surface of the housing, the first installation washer seals a first gap between the housing and the covering portion. A second installation washer is secured to the cover and abuts each edges of the body, the second installation washer seals a second gap between the cover and the body.

20 Claims, 3 Drawing Sheets

WATERPROOF DEVICE

BACKGROUND

1. Technical Field

The present disclosure relates to waterproof devices, and particularly a waterproof device for receiving an electronic device.

2. Description of Related Art

A card reader is generally used in an anti-theft device, such as a container and a burglarproof door, and users use the card identification method to keep the anti-theft device safe. The card reader is received in a receiving case, and then is secured in the receiving case of the container or the burglarproof door. However, there is often a gap between the receiving case and the container or the burglarproof door. When water passes the waterproof device, water may flow into the receiving case through the gap to damage the card reader. Therefore, an improved waterproof device for receiving an electronic device may be desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
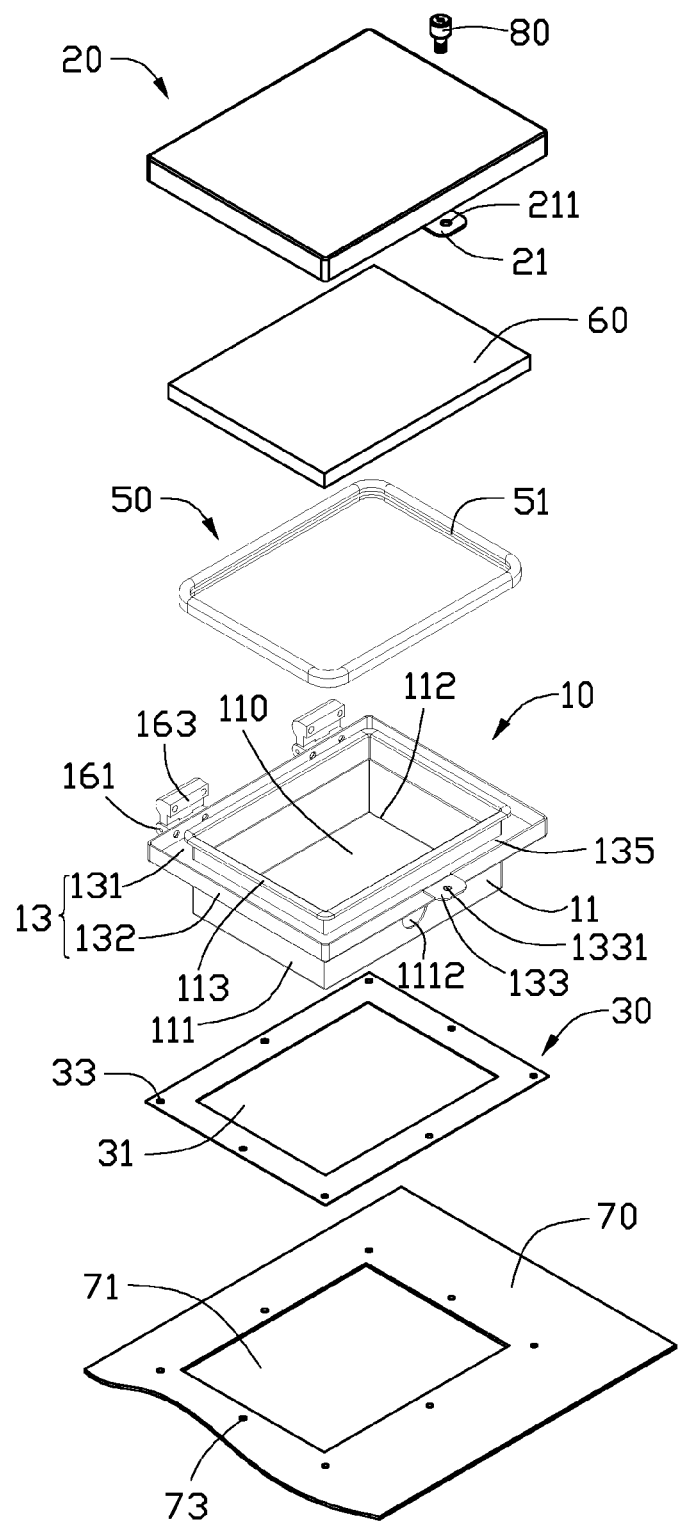
FIG. 1 is an exploded, isometric view of one embodiment of a waterproof device.

Referring to FIG. 1, one embodiment of a waterproof device comprises a receiving case 10, a cover 20, a first installation washer 30, a second installation washer 50, and a third installation washer 60.

The receiving case 10 comprises a body 11 and a coving portion 13 located on each outer surface of the body 11. The body 11 comprises a bottom plate 110 and four side plates 111 substantially perpendicular to the bottom plate 110. The bottom plate 110 and the four side plates 111 together define a receiving space 112. The receiving space 112 is adapted to receive an object (not shown), such as a card reader, to be waterproofed. Each of the four side plates 111 defines a through hole 1112 adapted for a plurality of passing wires. A flange 113 extends from a top edge of each of the four side plates 111. The coving portion 13 is located on each of the four side plates 111 and comprises a bottom wall 131 and four sidewalls 132 extending from each side edge of the bottom wall 131. The bottom wall 131 and the four sidewalls 132 together define a receiving slot 135. The bottom wall 131 defines a plurality of first mounting holes 1311 (shown in FIG. 3). Two securing members 16 are located on one of the four sidewalls 132. Each of the two securing members 16 comprises a securing portion 161 secured to the one of the four sidewalls 132, and a rotating portion 163 rotatably secured to the securing portion 161. A first mounting piece 133 extends from another one of the four sidewalls 132, which is opposite to the one of the four sidewalls 132. In one embodiment, the first mounting piece 133 is substantially perpendicular to the four sidewalls 132. The first mounting piece 133 defines a first locking hole 1331.

A second mounting piece 21, corresponding to the first mounting piece 133, is located on a first side of the cover 20. A second side of the cover 20 opposite to the first side is secured to the rotating portion 163. The second mounting piece 21 defines a second locking hole 211.

The first installation washer 30 defines an opening 31, which the body 11 to pass through. The first installation washer 30 further defines a plurality of a second mounting holes 33 corresponding to the plurality of first mounting holes 1311. In one embodiment, the first installation washer 30 is a rubber seal.

The second installation washer 50 defines an installation slot 51. In one embodiment, the second installation washer 50 is a square ring and made of rubber.

The third installation washer 60 is adapted to seal a gap between the cover 20 and the body 11. In one embodiment, the third installation washer 60 is foam.

Figure 2:
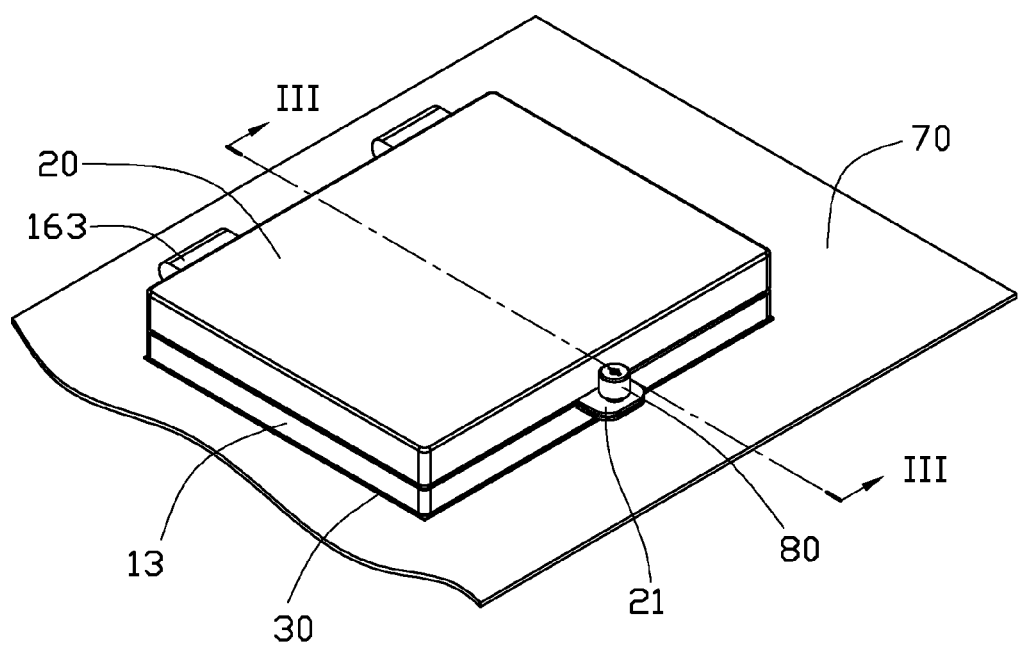
FIG. 2 is an isometric assembled view of the waterproof device of FIG. 1.
Figure 3:
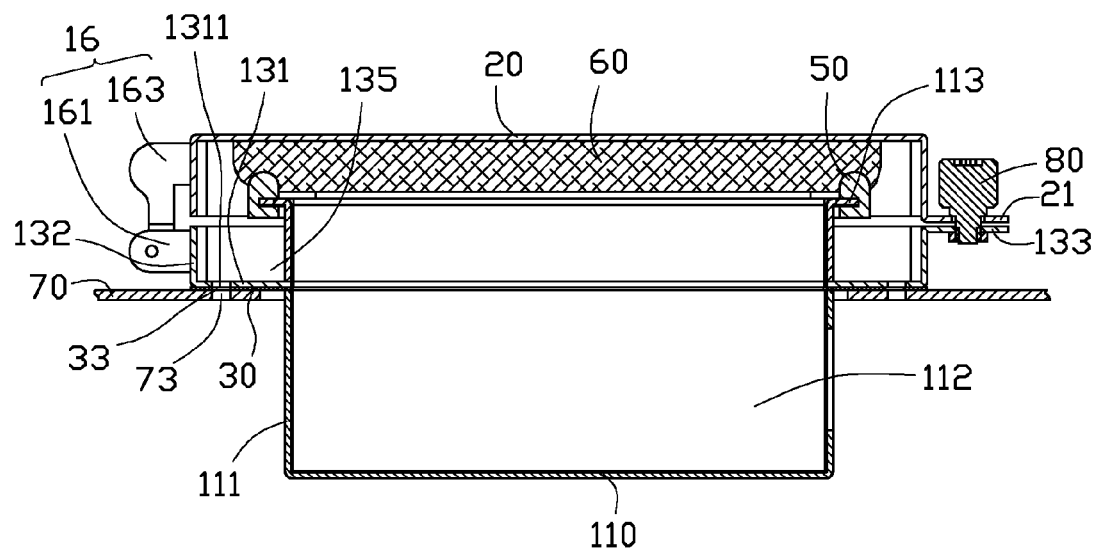
FIG. 3 is a cross-sectional view taken along the line III-III in FIG. 2.

Referring to FIGS. 2 and 3, in assembly, the first installation washer 30 is attached to a bottom surface of the bottom wall 131, and each of the plurality of second mounting holes 33 is aligned with each of the plurality of first mounting holes 1311. The second installation washer 50 is attached to the flange 113, secured in the installation slot 51. The third installation washer 60 is secured to the cover 20. The first side of the cover 20 is secured to the rotating portion 163. The cover 20 is rotatable relative to the receiving case 10. The cover 20 is rotated towards the covering portion 13 until the cover 20 abuts the covering portion 13, and the second mounting piece 21 abuts the first mounting piece 133. The third installation washer 60 and the second installation washer 50 are elastically deformed and abut each other. Then, the third installation washer 60 and the second installation washer 50 seal a gap between the cover 20 and the receiving space 112. A locking member, such as a screw, is inserted into the second locking hole 211 and the first locking hole 1331, and then the cover 20 is secured to the receiving case 10.

The waterproof device can be secured to a housing 70. The housing 70 defines a receiving opening 71 and a plurality of third mounting holes 73. In one embodiment, the housing 70 is a housing of a cloud server or a container server. In assembly of the waterproof device to the housing 70, the receiving case 10 is placed in the housing 70 through the receiving opening 71, and the coving portion 13 is located outside of the housing 70. The first installation washer 30 is attached to an outer surface of the housing 70. The first installation washer 30 seals a gap between the bottom wall 131 and the housing 70, one of a plurality other locking members (not labeled), such as screws, is inserted into each of the plurality of third mounting holes 73, each of the plurality of second mounting holes 33, and each of the plurality of first mounting holes 1311. The waterproof device is secured to the housing 70.

In use, when water passes the waterproof device, the water will not flow into the receiving space 112 through the gap between the bottom wall 131 and the housing 70. If the water flows into the receiving slot 135 through a gap between the cover 20 and the coving portion 13, because the third installation washer 60 and the second installation washer 50 seal the gap between the cover 20 and the receiving space 112, the water will not flow into the receiving space. The water flows out of the receiving slot 135 through the gap between the cover 20 and the coving portion 13.

In another embodiment, the waterproof device comprises the receiving case 10, the cover 20, the first installation washer 30, and the third installation washer 60. The third installation washer 60 abuts the flange 113, and the third installation washer 60 is elastically deformed to seal the gap between the receiving space 112 and the cover 20. The first installation washer 30 seals the gap between the bottom wall 131 and the housing 70.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure, to the full extent indicated by the broad general meaning of the terms in which the appended claims are expressed.

What is claimed is:

1. A waterproof device comprising:
   a housing comprising an outer surface;
   a receiving case comprising a body and a covering portion extending outwards from the body, the body is inside of the housing, and the covering portion abuts the outer surface of the housing; and the body receives an object to be waterproofed;
   a cover secured to the covering portion;
   a first installation washer secured between the covering portion and the outer surface of the housing, the first installation washer seals a first gap between the housing and the covering portion; and
   a second installation washer secured to the cover and abutting each edges of the body, the second installation washer seals a second gap between the cover and the body;
   wherein a receiving slot is defined between the covering portion and the body, and the receiving slot directs water flow out of the body when the water flows into a third gap defined between the cover and the covering portion.

2. The waterproof device of claim 1, wherein the body defines a through hole, the through hole accommodates a plurality of cables of the object.

3. The waterproof device of claim 1, wherein the first installation washer defines an opening, the body of the receiving case passes through the opening of the first installation washer.

4. The waterproof device of claim 1, wherein the body comprises a bottom plate and four side plates substantially perpendicular to the bottom plate, the covering portion is located on the four side plates, the covering portion comprises a bottom wall and four sidewalls extend from the bottom wall; the bottom wall is substantially perpendicular to the four side plates, and the four sidewalls are substantially parallel to the four side plates.

5. The waterproof device of claim 4, wherein the receiving slot is defined between the covering portion and the four side plates, and the receiving slot directs water flows into the body through a top portion of the third gap to flow out of the body through a bottom portion of the third gap along the receiving slot.

6. The waterproof device of claim 4, wherein the body further comprises a plurality flanges extending from a top edge of each of the four side plates, the second installation washer abuts the plurality of flanges.

7. The waterproof device of claim 6, further comprising a third installation washer and the third installation washer is secured to the plurality of flanges.

8. The waterproof device of claim 7, wherein the second installation washer and the third installation washer are elastically deformed and abut each other.

9. The waterproof device of claim 8, wherein a securing portion and a rotating portion are located on the covering portion, the securing portion is secured to the covering portion, and the rotating portion is rotatably attached to the securing portion.

10. The waterproof device of claim 9, wherein the cover is secured to the rotating portion, and the cover is rotatable relative to the body.

11. A waterproof device comprising:
    a housing comprising an outer surface;
    a receiving case comprising a body and covering portion extending from the body, the body is inside of the housing, and the covering portion abuts the outer surface of the housing; and the body receives an object to be waterproofed;
    a cover secured to the covering portion;
    a first installation washer secured between the covering portion and the outer surface of the housing, the first installation washer seals a first gap between the housing and the covering portion;
    a second installation washer secured to the cover; and
    a third installation washer secured to each top edge of the body, the second installation washer abutting the third installation washer, the second installation washer and the third installation washer together seal a second gap between the cover and the body;
    wherein a securing portion and a rotating portion are located on the covering portion, the securing portion is secured to the covering portion, and the rotating portion is rotatably attached to the securing body.

12. The waterproof device of claim 11, wherein the body defines a through hole, the through hole accommodates a plurality of cables of the object.

13. The waterproof device of claim 11, wherein the first installation washer defines an opening the body of the receiving case passes through the opening of the first installation washer.

14. The waterproof device of claim 11, wherein the body comprises a bottom plate and four side plates substantially perpendicular to the bottom plate, the covering portion is located on the four side plates, the covering portion comprises a bottom wall and four sidewalls extend from the bottom wall; the bottom wall is substantially perpendicular to the four side plates, and the four sidewalls are substantially parallel to the four side plates.

15. The waterproof device of claim 14, wherein a receiving slot is defined between the covering portion and the four side plates, a third gap is defined between the cover and the covering portion, the receiving slot direct water flows into the body through a top portion of the third gap to flow out of the body through a bottom portion of the third gap along the receiving slot.

16. The waterproof device of claim 14, wherein the body further comprises a plurality flanges extending from the each top edge of the body, the each top edge of the body is each top wall of the four side plates, and the third installation washer is secured to the plurality of flanges.

17. The waterproof device of claim 16, wherein the third installation washer defines a securing slot, the plurality of flanges is sandwiched in the securing slot.

18. The waterproof device of claim 11, wherein the second installation washer and the third installation washer are elastically deformed and abut each other.

19. The waterproof device of claim 11, wherein the cover is secured to the rotating portion, and the cover is rotatable relative to the body.

20. A waterproof device comprising:
a housing comprising an outer surface;
a receiving case comprising a body and a covering portion extending from the body, the body is inside of the housing, and the covering portion abuts the outer surface of the housing; and the body receives an object to be waterproofed;
a cover secured to the covering portion;
a first installation washer secured between the covering portion and the outer surface of the housing, the first installation washer seals a first gap between the housing and the covering portion; and
a second installation washer secured to the cover and abutting each edges of the body, the second installation washer seals a second gap between the cover and the body
wherein the body comprises a bottom plate and four side plates substantially perpendicular to the bottom plate, the covering portion is located on the four side plates, the covering portion comprises a bottom wall and four sidewalls extend from the bottom wall; the bottom wall is substantially perpendicular to the four side plates, and the four sidewalls are substantially parallel to the four side plates.

* * * * *